United States Patent [19]

Pasternak et al.

[11] Patent Number: 5,710,756
[45] Date of Patent: Jan. 20, 1998

[54] BURST-ERROR RESISTANT ATM MICROWAVE LINK AND NETWORK

[75] Inventors: Eliezer Pasternak, Palo Alto; Gideon Ben-Efraim, Cupertino, both of Calif.

[73] Assignee: Netro Corporation, Santa Clara, Calif.

[21] Appl. No.: 538,327

[22] Filed: Oct. 3, 1995

Related U.S. Application Data

[63] Continuation-in-part of Ser. No. 388,110, Feb. 13, 1995, Pat. No. 5,648,969.

[51] Int. Cl.$^6$ ............................. G06F 11/10; H04L 12/56
[52] U.S. Cl. ......................... 370/216; 370/338; 370/349; 370/395; 371/37.1
[58] Field of Search .................... 370/216, 242, 370/244, 313, 314, 336, 337, 338, 345, 347, 349, 389, 392, 395, 396, 400, 401, 474, 476, 477, 505, 506; 371/37.1, 37.3, 37.4, 37.5, 37.7; 341/67, 94; 348/466, 467

[56] References Cited

U.S. PATENT DOCUMENTS

| | | | |
|---|---|---|---|
| 5,161,194 | 11/1992 | Ujiie | 380/48 |
| 5,230,002 | 7/1993 | Yamashita et al. | 371/37.1 |
| 5,258,762 | 11/1993 | Cabon et al. | 342/42 |
| 5,379,116 | 1/1995 | Wada et al. | 358/431 |
| 5,404,374 | 4/1995 | Mullins et al. | 375/200 |
| 5,412,660 | 5/1995 | Chen et al. | 370/110.1 |
| 5,434,853 | 7/1995 | Hemmady et al. | 370/60 |
| 5,534,937 | 7/1996 | Zhu et al. | 348/466 |
| 5,557,621 | 9/1996 | Nakano et al. | 371/37.1 |
| 5,563,887 | 10/1996 | Harasaki | 370/94.1 |

*Primary Examiner*—Alpus H. Hsu
*Attorney, Agent, or Firm*—Skjerven, Morrill, MacPherson, Franklin & Friel; Alan H. MacPherson; Bernard Berman

[57] ABSTRACT

A digital radio link suitable for transmitting digital voice or data signals includes an input circuit for ATM or frame relay cells/frames attached to an ATM or Frame Relay network, a forward error correction encoder and decoder with indication of uncorrectable blocks due to large bit errors such as burst errors, a payload processing module for modifying bits in the frames or cells so that frames/cells extracted from a forward error correction ("FEC") block containing bit errors will not be misinserted by the network.

5 Claims, 8 Drawing Sheets

Block Diagram of an access node of this invention

FIG. 1

A typical city arrangement in which a wireless network of this invention is installed

FIG. 2 Basic Building blocks of a point-to-point access node of this invention

Physical implementation of an access node

FIG. 3

Physical implementation of a family of
metropolitan area network nodes based on this invention

*FIG. 4*

Access node of this invention attached to different networking systems

FIG. 5

Block diagram of Payload Processing Module transmit side

Block Diagram of an access node of this invention

Processing steps of Frame Relay-like information

FIG. 7

Processing steps of ATM information

FIG. 8

Block diagram of Payload Processing module receive side

FIG. 10

Radio Unit Block Diagram

FIG. 11

BURST-ERROR RESISTANT ATM MICROWAVE LINK AND NETWORK

RELATED APPLICATION

This application is a continuation-in-part of our previous application Ser. No. 08/388,110 filed on Feb. 13, 1995, now U.S. Pat. No. 5,648,969.

BACKGROUND OF THE INVENTION

1. Field of the Invention

This invention relates to the field of telecommunication networks and packet switching and in particular to providing reliable radio-based links for cell and frame-switched networks.

2. Description of the Related Art

Cell-based packet switching networks are becoming widely available. The use of small (i.e. "short") packets of information is preferred in modern digital networks because it enables the efficient mixing of synchronous and asynchronous information, thus providing cost-effective transport of digital voice, LAN data and video. Furthermore, short packets, also known as "cells", can be switched by integrated circuits, allowing quick and economical switching of data in broadband fiber optics networks. This concept is known in the telecom industry as "Asynchronous Transfer Mode" (ATM). ATM networks are commercially available. ATM protocols have been formalized by various international organizations, including the ITU and the ATM Forum. ATM networks were specified assuming the use of fiber optics links for transmission. Due to the very low bit error rate of fiber optic links, ATM networks do not provide extra overhead services to guarantee end-to-end delivery of cells. Cells are routed through the network, but if an error occurs (or a buffer overflows), cells may be discarded. The simplicity of "best effort" cell delivery results in a fast and cost effective network.

Typical fiber networks consist of long-haul fiber links interconnecting ATM switches. These switches may be connected by fiber optics links to customer sites, such as office buildings and homes. In the customers' buildings there are network access nodes that combine and convert a user's information to ATM cells for transmission over the network.

Although fiber optics links are becoming the preferred medium for terrestrial links, they are not always available. City regulation, installation costs, long installation time and legal right-of way issues prevent some regions from installing fiber optics links. Some cities may have fiber optics links installed, but owned by a monopoly which a service provider may wish to bypass.

Digital microwave radio links can provide an alternative to fiber optics links between network access nodes and ATM switches. Frequency bands within the range of about 300 MHz to 60 GHz have been allocated for commercial communications. Some microwave links in the millimeter wave region are unlicensed or licensed for low usage fees by the local authorities. Microwave radio links then become a cost-effective and a timely solution to the deployment of telecommunication links. There is a drawback, however, to these microwave radio links. Digital microwave radio communication is prone to bit errors, especially under weather-induced fading conditions, such as rain. Some forward error correction, redundancy and retransmission protocol schemes have been devised to improve the performance of microwave links. The problem with these approaches is that they are not directly applicable for ATM, Frame Relay and similar types of packet switched traffic. Retransmission is unacceptable because of the delay it introduces. Forward error correction alone does not protect from antenna obstruction or antenna failure. Redundancy by parallel links is too costly and still prone to common link obstructions such as weather-induced signal degradation. These problems have been addressed by our above-mentioned application. However there are other problems that the previous application does not address. The actual migration to ATM-based networks is a gradual process in which non-ATM traffic may co-exist with ATM traffic. For example, a customer may desire to connect four E1 lines to a point of presence, wherein one E1 carries digital voice (Pulse code Modulation—PCM) from a switch (Private Branch Exchange—PBX) using non-ATM primary rate ISDN format. Another E1 may carry data from a router or a concentrator, following frame relay format. Yet another E1 may include ATM-like protocols that do not conform with a standard ATM format, intended for trunk connection between similar switches, and finally the fourth E1 may be standard ATM, complying with the ATM forum. These lines need to be combined on a single radio link, line receiving the quality of service appropriate to the type of information it carries. Frame-relay and ATM-like protocols are all based on transmission of packets of variable or fixed size, commonly referred to below as "frames". These frames may have error checksums to allow the receiving system to reject frames containing errors. However, there is a small probability that a frame will contain errors, yet the checksum will be valid. Whenever a burst error occurs that a forward error correction system cannot correct, the frame is delivered with the error. If the checksum appears valid, the frame may be delivered to a wrong address, a process called "misinsertion". Another problem with current approaches is the lack of standard methodology for forward error correction (FEC). FEC requires expensive digital circuitry. Cost could be reduced if the transmitted information format could rely on FEC technologies available for mass markets.

Yet another problem is the reusability of a radio system for changing needs. Installing a radio system on a roof of a building is expensive. When user requirements are changing, for example a higher data rate is desired, a new outdoor radio unit needs to be installed. This also is forcing the network integrator to store many varieties of radio units, differing in frequency channel, data rate and modulation scheme.

SUMMARY OF THE INVENTION

This invention provides burst-error resistant microwave radio-based communication links for ATM and non-ATM transmission.

In accordance with this invention, a cell-based access network is formed to connect multiple customer sites to a switching center. The network as a whole, and each link in this network, are especially designed to provide reliable service under bit-error conditions.

In accordance with one embodiment of this invention, at the link level, reliable service is provided by subsystems called "Trunk Units" (TU) which process information before and after transit through the error-prone radio link. At the transmit side, the TU first multiplexes bit streams from multiple inputs into a combined bit stream using time division multiplexing (TDM). Then the TU splits the information to be transmitted into blocks of a fixed size. These blocks are encoded for forward error correction (FEC). If bit errors occur in a block, the FEC decoder circuit normally corrects them. If the errors cannot be corrected by the FEC circuit, an indication is passed to a Payload Processing Module (PPM) circuit that can be customized to be compatible with the switch manufacturer, which depending on the type of connection in each line either:
passes the error-containing information unchanged or:
modifies the information content to ensure that it will not be misinserted.

The misinsertion protection is provided to streams containing ATM, frame relay or similar frame-based protocols. Misinsertion protection is provided by modifying the data with abort sequences (for High-Level Data Link Control (HDLC)-like protocols), or by deliberately corrupting the error checksum of either the ATM header or High-level Data Link Control (HDLC) frame, as appropriate. The networking equipment will automatically reject such corrupted frames.

To come up with a cost effective FEC circuit, this invention uses the FEC block format that conforms with standards used for Digital Video Broadcasting (DVB). DVB circuits use Reed Solomon (RS) code with interleaving and in combination with Viterbi convolutional decoder. The combined Viterbi-RS code is known as a concatenated code. The Viterbi convolutional code and the interleaving functions are not desired for wireless ATM and telephony applications because they use extra bandwidth and delay, respectively. Therefore these functions are normally bypassed, but are optionally included if further error correction performance is desired at the expense of bandwidth (Viterbi) and delay (interleaving).

The generality of the Radio Unit RU in accordance with this invention is provided by the use of a linear transmission scheme on the outdoor part. The RU is performing translation and amplification with linear wideband amplifiers of the signal sent from the indoor TU. Therefore various modulation schemes can be used, such as QPSK, FSK, QAM, MSK or any other band-limited scheme. The change of modulation scheme requires only a change of an indoor modem.

The radio link as described above can be combined with other network access systems or alternate links (microwave relay radios or fiber optics links) from a network. The network, in one embodiment, has a mesh topology, but not necessarily a full mesh. In other embodiments, single or multiple rings are also acceptable topologies. The network links bit rate is higher than the total bit rate of the user information transmitted via these links. The extra bandwidth of the network links allows protection bits to be carried that add protection to the information being transported via the microwave network.

This invention will be more fully understood in conjunction with the following detailed description taken together with the drawings.

DETAILED DESCRIPTION

Figure 1:
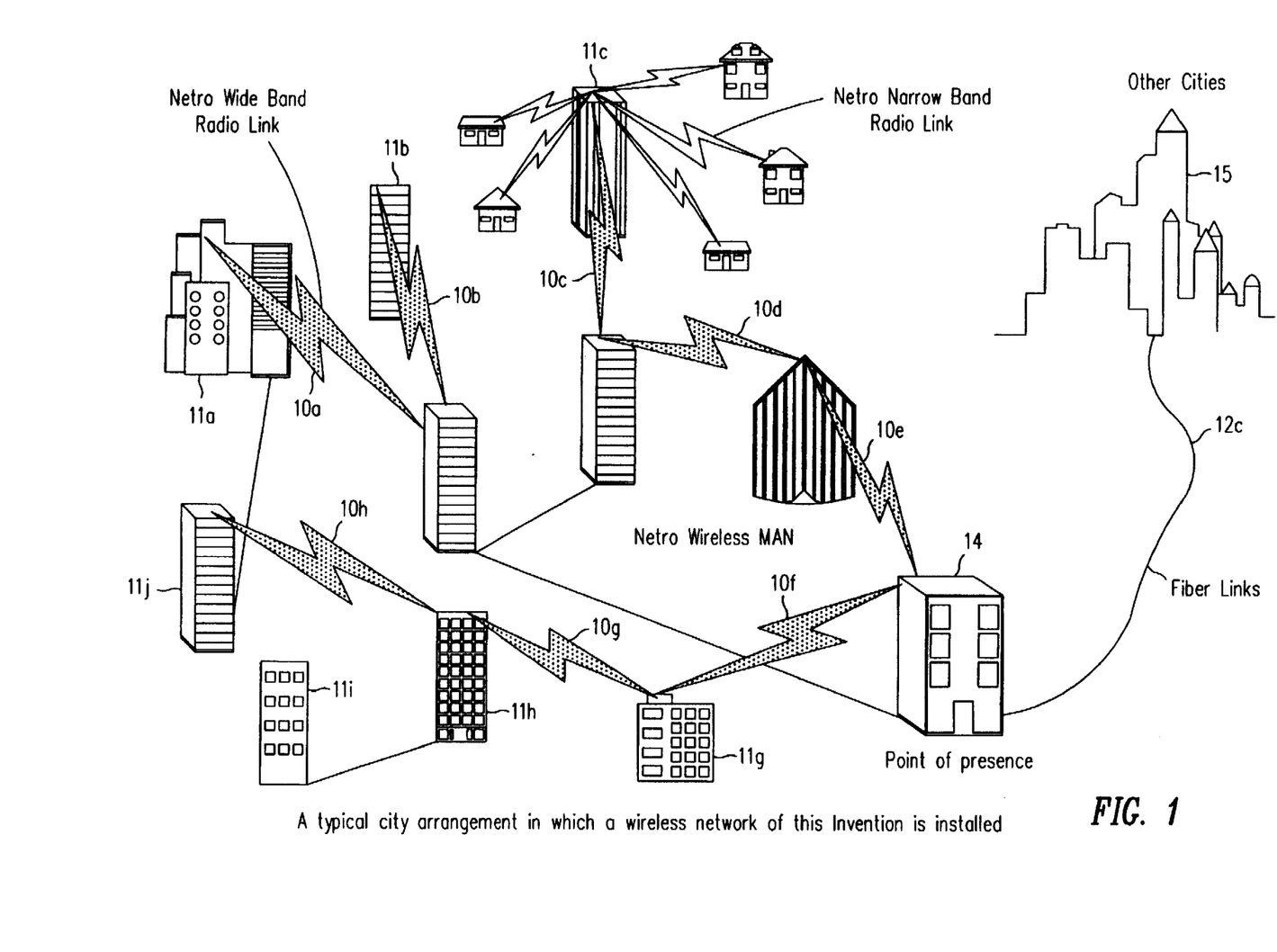
FIG. 1 shows a wireless network of a type suitable for use in a city.

Certain abbreviations used in this application are defined below.
AN Access Node
ARQ Automatic Retransmit Request
ATM Asynchronous Transfer Mode
AU Access Unit
CU Control Unit
CRC Cyclical Redundancy Checking
DC direct current
DVB Digital Video Broadcast
E1 European digital line interface at 2.048 Mbps.
E2 European digital line interface at 8.448 Mbps.
E3 European digital line interface at 34.0368 Mbps.
EPROM Erasable Programmable Read-Only Memory
EEPROM Electrically-Erasable Programmable Read-Only Memory
FEC Forward Error Correction
FPGA Field programmable gate array
FSK Frequency shift keying
HDLC High Level Data Link Protocol-a bit-oriented synchronous link layer protocol
HEC Header error control
IP Internet Protocol
LAN Local Area Network
LED Light Emitting Diode
LNA Low Noise Amplifier
Mbps Mega bits per second
MHz Mega Hertz
MIB Management information base
MMIC Monolithic Microwave Integrated Circuit
MSK Minimum shift keying
NAS Network Access System
NMS Network Management System
PBX Private Branch Exchange, a generic term for a voice switch
PCM Pulse Code Modulation
POP Point of presence
PPM Payload Processing module
PROM Programmable Read-Only Memory
PTT Postal, Telegraph and Telephone, a common name for government service providers
QPSK Quadrature phase shift keying
QAM Quadrature amplitude modulation
RU Radio Unit
RS Reed Solomon
SNMP Simple Network Management Protocol
STM Synchronous Transfer Mode
Terminal A system consisting of NAS, RU and the interconnections
TMN Telecommunications Management Networks
TU Trunk Unit
VCI Virtual channel identifier
VPI Virtual path identifier
X.25 An international user-network data communication interface standard A metropolitan area network in accordance with this invention is shown in FIG. 1. The dark arrows 10a through 10h represent wireless links with radio transceivers (not shown) at each end. These wireless links connect buildings shown as 11a through 11j in a city to a central office 14 also called a "point of presence". The point of presence 14 ("POP") includes ATM switches, frame relay datacom (X.25) switches and voice switches. This invention allows exchange of digital voice and data between these switches and makes available ATM developed for fiber optics for transmission by digital radio. A network allows the extra benefits of relaying information from remote stations such as at location 15, even if the remote stations have no direct line of sight to the point of presence 14, as well as providing redundant links, and the ability to concentrate information from multiple nodes.

Figure 2:
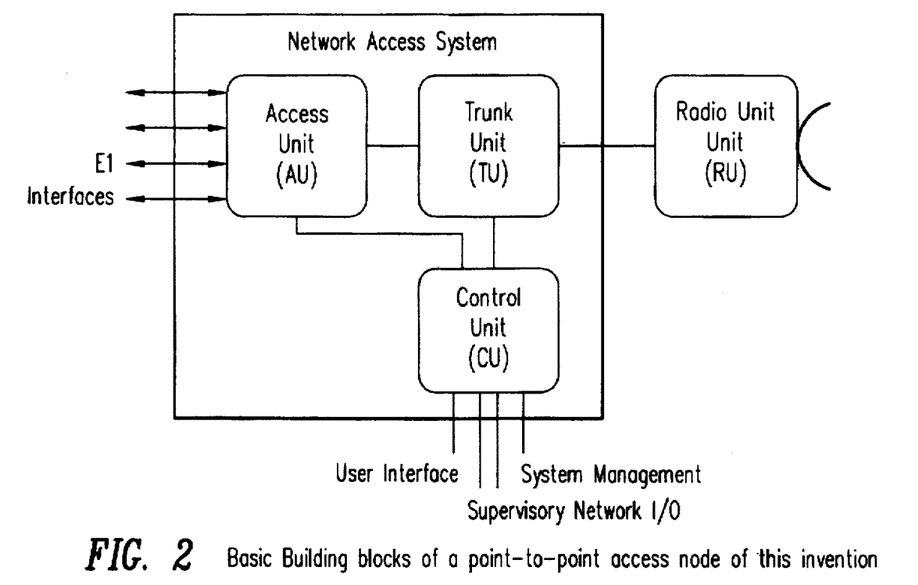
FIG. 2 shows the basic building blocks of a point-to-point access node of this invention.

The minimum access node for a point-to-point link of this invention is depicted in FIG. 2. This minimum system is sufficient if the advantages of a full network are not required or if networking equipment is already available and wireless link extension of this networking equipment is desirable. An access unit (AU) is capable of interfacing with a variety of local interfaces. In the AU, the signals from these interfaces are either converted to ATM cells, which are delivered to a trunk unit (TU) or are kept in the original format for time division multiplexing at the TU. A suitable AU can be purchased today from a large number of vendors, for example ADC-Kentrox of Portland, Oreg. In the preferred embodiment, an Access Unit comprised of four E1 interfaces is used. An appropriate AU can be designed as a set of electronic cards and software, as described below. A non-ATM AU may consist of an interface IC for, say, E1 line, providing data and clock lines to the Trunk Unit. A non-ATM AU can still carry ATM traffic originating in external ATM equipment that maps ATM cells onto E1 physical layer interfaces. The TU includes the Payload Processing Module (PPM) that can identify cell or frame boundaries, encapsulate the cells if so desired and deliver them to a multiplexer. A TDM multiplexer in the TU combines the user bit streams, adds FEC and other overhead and modulates the aggregate bit stream for transmission. The TU and PPM are key elements of this invention. The TU outputs a modulated serial bit stream to the RU which is placed on the outside wall or roof of a building, attached to a dish antenna. A twisted pair cable, coax or fiber optics link connects the RU to the TU. The RU up-converts the modulated bit stream and transmits it at the desired microwave frequency. This system operates normally in a full-duplex mode; thus the RU also receives a bit stream from an opposite access node and delivers this bit stream to the TU. The TU processes this received bit stream, including error correction and using the PPM to mark the dropping of cells or frames that are included in non-recoverable FEC blocks. The TU delivers good cells to the AU and logs or reports cell loss to a Control Unit (CU)—a microprocessor circuit.

Figure 3:
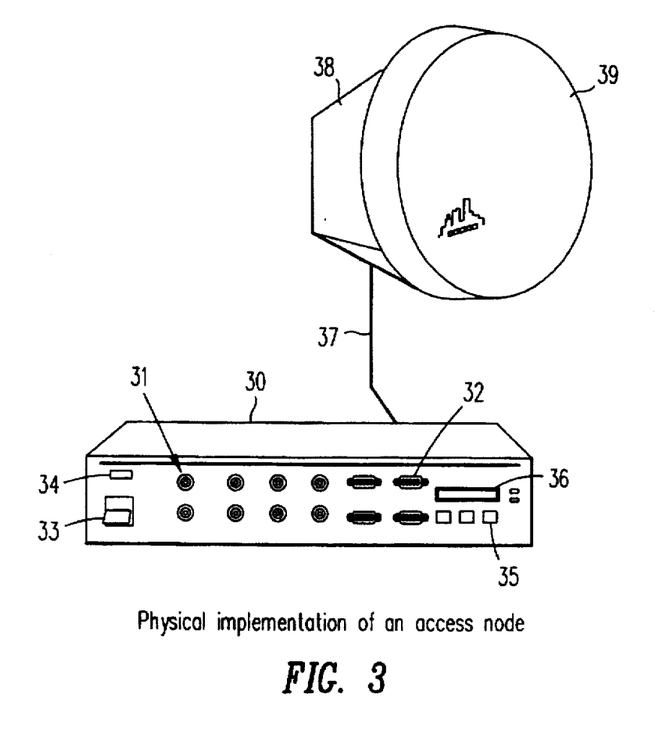
FIG. 3 shows a physical implementation of an access node.
Figure 4:
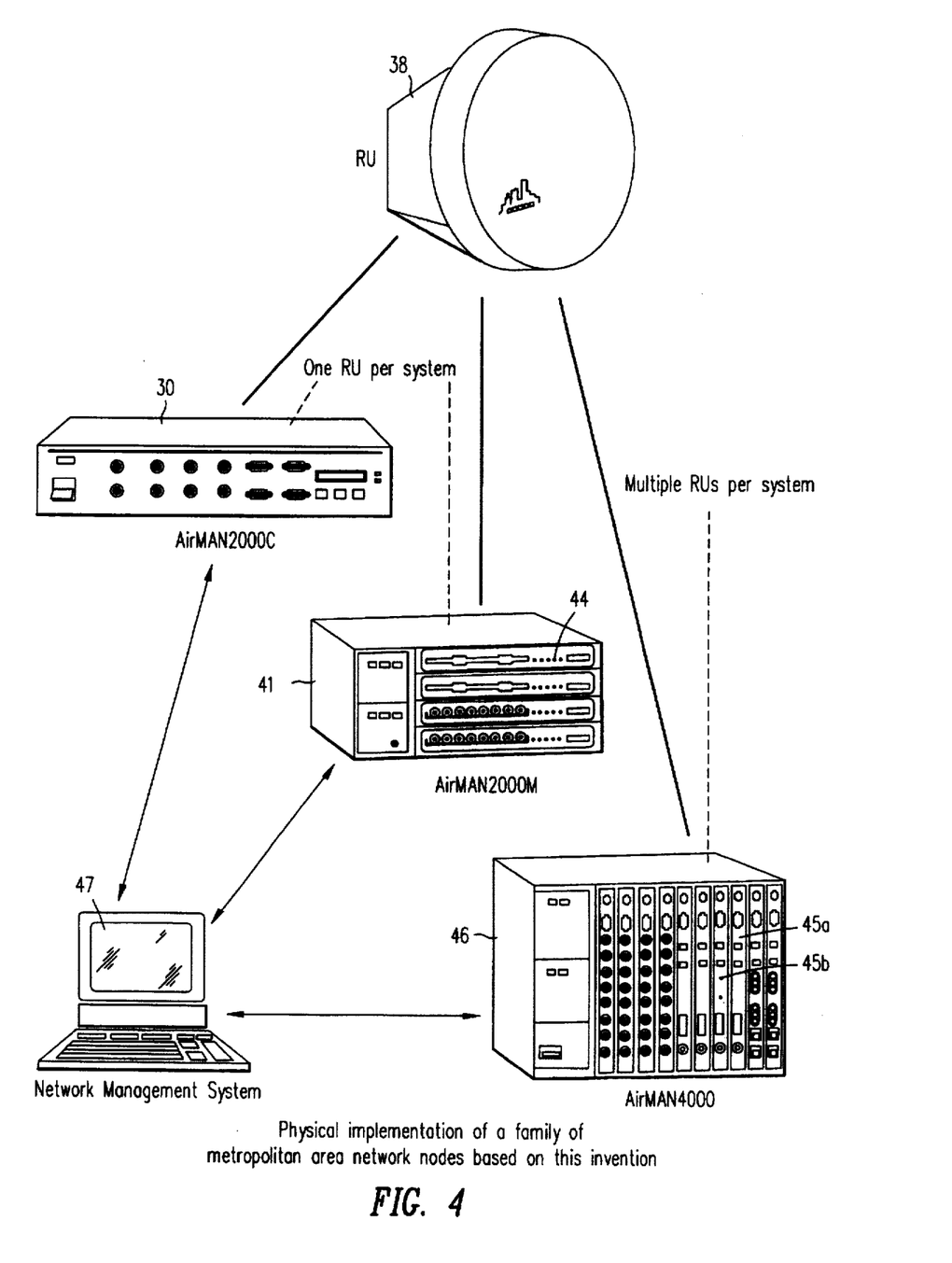
FIG. 4 illustrates a product family based on the protected link of this invention.

A physical implementation of this system is shown in FIG. 3. A Network Access System 30 ("NAS") is built into a metal enclosure. The E1 interfaces are provided by connectors, such as BNC 31. Other connectors 32 allow NMS and user access. An On-off switch 33 controls power and an LED 34 displays power state. Other displays 35, 36 allow monitoring of link condition, the transmitted frequency or any other desirable condition. A coax cable 37 connects the NAS 30 with the RU 38. A dish antenna 39 attached to the RU provides transmission to and from the remote side of the link. This system, combining NAS 30 and RU 38 is also shown in FIG. 4.

Other products can also be built on the principles of this invention. When access functions are desired, converting non-ATM traffic to ATM and multiplexing it with other ATM traffic, an integrated access node 41 can be provided. This access node 41 includes ATM access technology which is available from other sources (as mentioned above), and the TU, CU and RU 32 of this invention. The TU can be implemented as a plug-in unit 44 into the backplane of such access node 41. If ATM switching is desired, multiple such RUs 28 can plug to multiple TUs 45a, 45b in a switching system 46. A network management system workstation 47 controls and configures the above systems. A communication protocol is established between each unit 30, 41, 46 and the workstation 47. SNMP protocol and a management information base (MIB) are a common way of managing such a network. It should be clear that a network may consist of a plurality of either one or more types of systems 30, 41 or 46.

Figure 5:
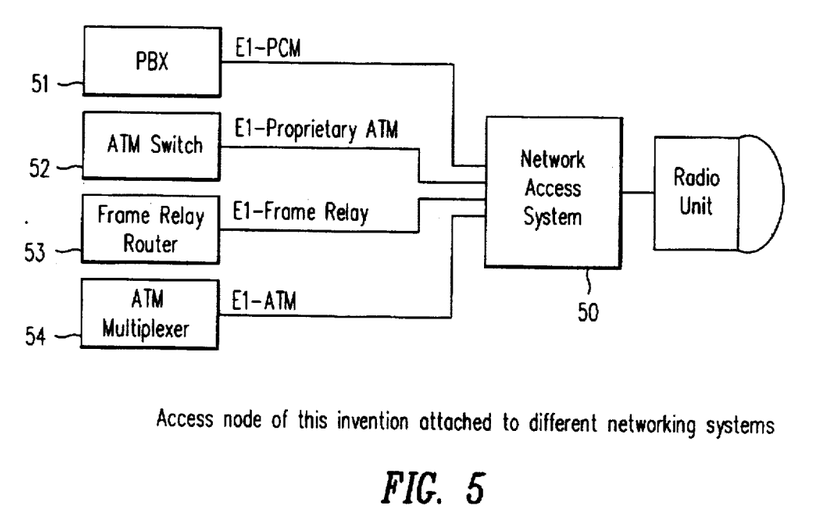
FIG. 5 illustrates attachment of an access node of this invention to different networking systems.

FIG. 5 depicts a four-E1 access node connected to different sources of information. This configuration is arbitrary; the NAS 50 can handle any combination of traffic types or equipment types. The NAS 50 is connected to a PBX 51 that provides PCM voice over the E1 interface. This voice is transmitted transparently via the NAS without extra protection. The FEC of the NAS normally provides error-free operation. If occasional burst errors occur which the FEC cannot correct, the user may hear some noise, which has little effect on the overall link quality. Another E1 port may be connected to an ATM switch 52 with proprietary ATM traffic. A proprietary ATM link does not adhere to an industry standard, however if the switch vendor agrees to specify the cell or frame format, the link can be given special treatment by the NAS. Since proprietary ATM links are similar to either standard ATM or to frame relay, the treatment of these inks is a straight-forward generalization of the frame relay and ATM interfaces to be discussed below. The third interface is connected to a frame relay router 53. Frame relay 53 is based on HDLC frames embedded in an E1 interface. When a frame relay frame is subject to a burst error in the radio link which FEC cannot correct, a misinsertion may take place. Misinsertion means that the frame may arrive at a different address, perhaps the address of a competitor of the original user. This event should be quite rare, because most frames containing errors will be rejected by the frame relay network equipment, because a frame containing errors will have a non valid CRC checksum. However a 16-bit CRC under burst error has a probability of about one in 65,000 to check valid despite the error. A network with a total throughput of billions of frames per day may have enough burst errors that some frames will be misinserted. Similarly, an ATM source 54 may have its ATM cells subject to uncorrectable burst errors and misinsertion.

Figure 6:
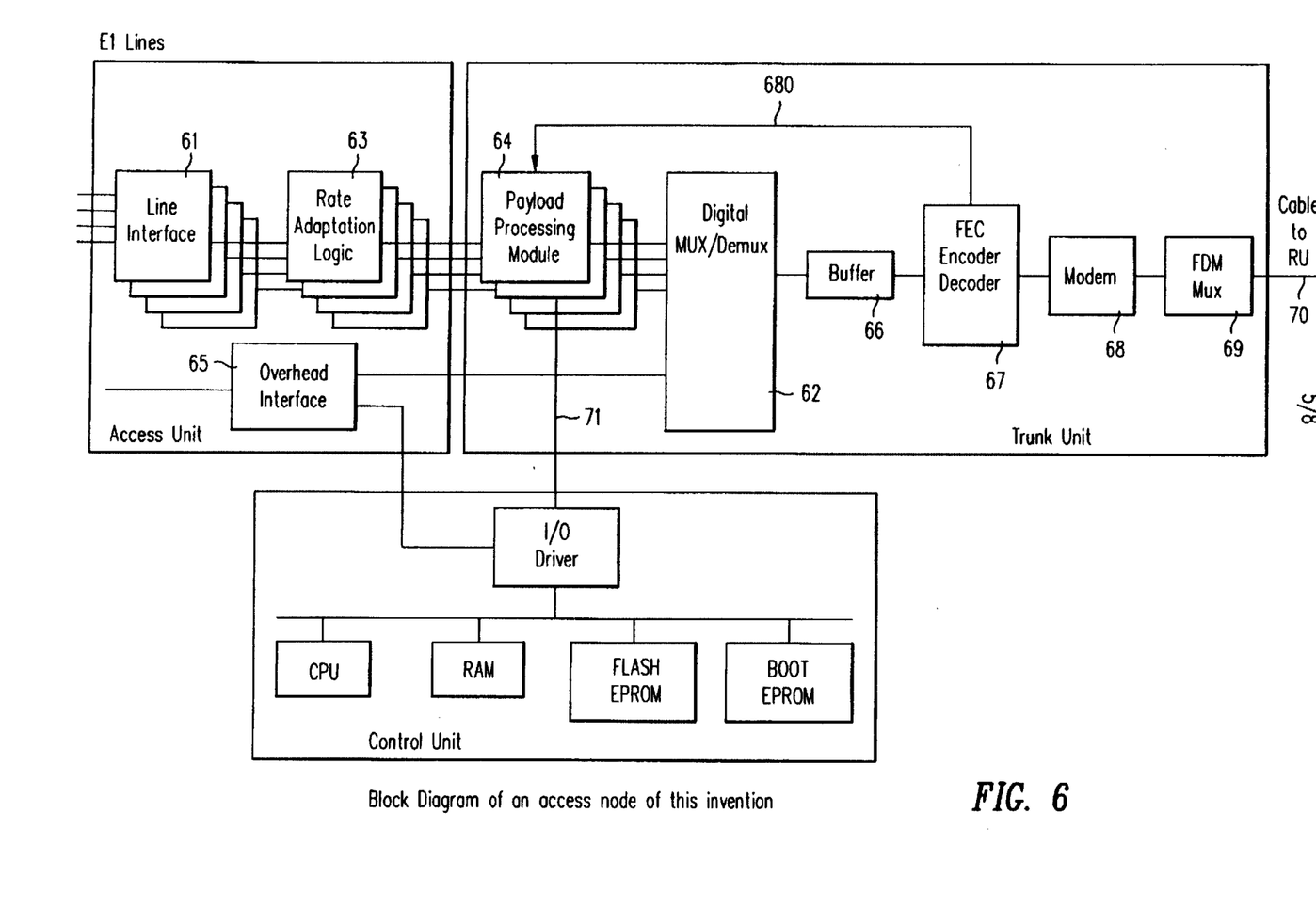
FIG. 6 illustrates a block diagram of an access node's Network Access System of this invention.

The NAS structure to handle such a mix of traffic is shown in FIG. 6. An access unit includes a plurality of line interfaces 61 (four in this example). Each line interface 61 converts one full-duplex E1 to NRZ clock and data signals. Such devices are available from many vendors, including Crystal Semiconductor Corp. of Austin, Tex. These bit streams will be time division multiplexed by a digital multiplexer 62 but since each E1 differs slightly in its clock rate, the E1 rate is adapted to the multiplexing rate by rate adaptation logic 63. This logic is similar to the functions done by T1 to T3 multiplexers which are well known. The multiplexing clock rate is nominally higher than the E1 clock by a few percent. Bit stuffing, stuff indication and framing are included in the multiplexing scheme, as is customary with such multiplexers. A payload processing module ("PPM") 64 performs the burst error protection processing, as discussed below. The interconnect lines in FIG. 6 represent bi-directional connections; thus the PPM 64 performs both the transmit and receive functions, as discussed below. The multiplexer 62 combines all of the PPM outputs and overhead bits (for NMS or similar functions gathered by an overhead interface 65) to a buffer 66. The buffer 66 is required because the next stage, FEC 67, must delay the inputting of data for transmission of an error correction checksum. FEC encoders and decoders are available in many forms; however the preferred embodiment uses a Reed Solomon (RS) code with a block size of 204 bytes and a data size of 188 bytes. The overhead is thus 16-bytes, which allows correction of up to eight bytes containing errors. If more than eight bytes contain errors, the decoder cannot correct the error. The decoder can indicate that an uncorrectable error has occurred. Due to the internal delaying of data for error correction purposes, the decoder can indicate the error at the same time that it outputs the data at its port. This indication is connected by conductor 680 to the PPM. An RS decoder may occasionally misinterpret a block containing large errors as a correctable one, but this event has a low probability. With the (204, 188) block size, the incorrect decoding probability is estimated as approximately one in 300,000, which is the ratio of valid or correctable blocks to the total number of possible blocks. This is the net gain in burst error protection, i.e. an FEC-protected link with a PPM of this invention is roughly 300,000 times less likely to cause misinsertion as the same link without a PPM. The RS (204, 188) code was standardized by the European Broadcasting Union specification DT/8622/DVB which is related to direct satellite video broadcast. The advantage of such an approach is the availability of integrated circuits for this function at high-volume and low cost by multiple vendors, including AHA of Pullman, Wash., LSI Logic of Milpitas, Calif. and VLSI Technology of San Jose, Calif. Most vendors provide a decoder only because it is also the mass market part in broadcasting. Fortunately, this is also the more complex part. Some vendors, including LSI, also have an encoder. Furthermore, the ICs include descrambling and framing of the FEC frame, further simplifying the implementation of a link. An example of a decoder chip is AHA4210. The frame generation and scrambling can be implemented by feedback shift-register techniques which are well known in the art of digital design. Since encoder designs exist, some of the above vendors provide such designs for custom logic of field programmable gate array implementation. Some FEC decoders do not allow bypassing the Viterbi decoder. It would be a simple technical task to request these vendors to modify the design to exclude the Viterbi Decoder, but it could be costly. Therefore, if the Viterbi decoder cannot be bypassed, a dummy Viterbi code can be emulated to gain access to the RS decoder. This is done as follows. The received digital information from the modem is byte-synchronized using the dedicated synchronization byte in the FEC block, or by phase-shifting a bit clock divided by eight until the RS decoder will lock. Once byte synchronization is accomplished, the bit stream is Viterbi encoded. A 2:1 encoding requires doubling of the bit clock; this can be done by a frequency doubler. Another code gain, such as 7:8 can be used, but is slightly more difficult to implement. The Viterbi encoder is made of eight D-flip flops and feedback logic, as described in error correction literature. The encoded bit stream enters the FEC decoder which "decodes" the Viterbi code without errors (the local digital connection from the Viterbi encoder to the FEC decoder is practically error-free). The rest of the decoding continues normally.

The FEC-encoded bit stream is driving a modem 68. This is a carrier-based QPSK modem. QPSK modem ICs are available off the shelf from LSI Logic, Plessey and Maxim. The modem transmit carrier is about 200 MHz and the receive frequency is 70 MHz. These frequencies are only examples, and their exact value may be adjusted to obtain a combination with minimum harmonic interference. Other modem types are possible. When bandwidth is critical, a QAM modulation may be chosen. The modem output is connected to a frequency division multiplexer 64, which consists of bandpass filters, one for each frequency involved. In addition to the 70 and 200 MHz mentioned above, a low frequency (say, 10.7 MHz) may be used for a data link with the RU microprocessor, via a small modem not shown in FIG. 6. DC power may be sent to the RU via the cable 70 and a low-pass filter.

The receive side is similar in construction. The data received by the modem 68 is connected to the FEC decoder 67. The data flows towards the E1 interfaces via the other processing blocks as shown. The control unit is a microprocessor board with software embedded in a boot EPROM, flash EPROM and RAM. The flash EPROM allows remote software upgrade via the NMS. The CPU board communicates with the system via I/O drivers. Only one I/O line 71 is shown, but almost every complex device is connected to the CU for configuration and alarm monitoring purpose.

Figure 7:
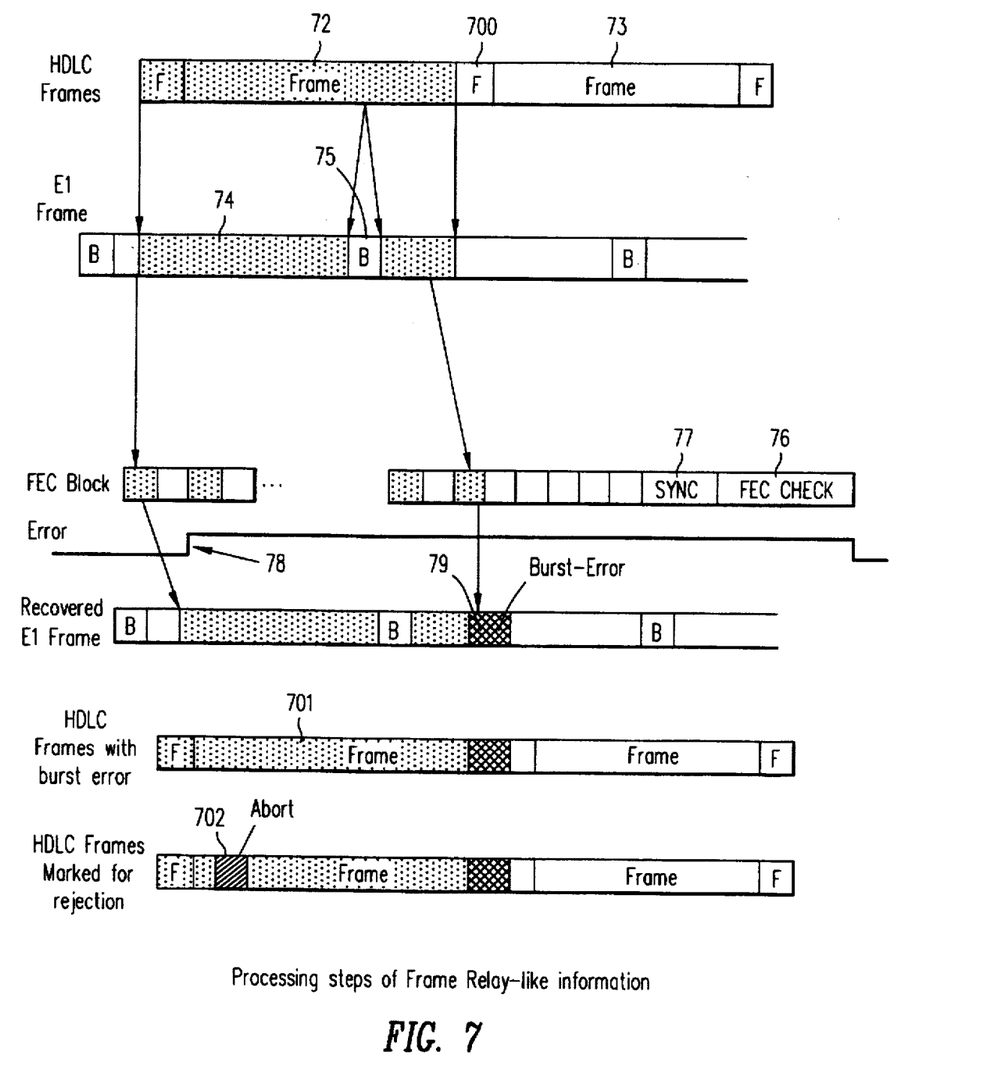
FIG. 7 illustrates processing of Frame Relay or similar frame-based data in this invention.

The processing steps of frame relay or similar type of frames are shown in FIG. 7. HDLC frames 72 are generated in router equipment for transmission. The frames are separated by at least one flag (01111110 symbol) according to the HDLC protocol. Thus a following frame 73 could originate from another user. The network can route frames to their destination based on address bits included in the frames. These bits usually indicate a virtual link number which is used by routing tables in the Frame Relay Network to route each frame to the next network node until it reaches its destination. This process takes place in routers or frame relay switches and is normally done outside the equipment of this invention. The frames are usually embedded into an E1 frame so that they can be sent over E1 transmission facilities. The frame 72 could be mapped onto an E1 frame, occupying the gray area 74 in the E1 frame. The HDLC frame 74 is interrupted periodically by E1 framing byte 75. This E1 interface, including its frame relay payload, is input to the NAS of this invention. For frame relay payload, the PPM transmit side in a preferred embodiment is transparent. The entire E1 bit stream, including E1 framing, is multiplexed with other PPM outputs, as was shown in FIG. 6. The multiplexer output is then buffered and FEC check word (16 bytes) 76 is appended. The combined transmission is called an "FEC block". It includes synchronization bits 77 that indicate block starting/ending and bit stuffing for the rate adaptation of each E1 line or other multiplexed tributary. These FEC blocks are usually received at the remote side of the link without errors. If a few errors occur, the FEC decoder corrects them. If more than 8 bytes contain errors in an FEC block, the FEC decoder is unable to correct the data. It can only indicate by an error signal 78 that starts at the beginning of the block that the following block contains unrecoverable errors. A typical digital radio not of this invention usually delivers the block with the errors to the output. However if a burst error corrupts parts of a frame 79, the flag 700 separating frames 72 and 73 may be eliminated by the error and the two frames may appear fused together as an enlarged frame 701. This combined frame appears to the network as a valid frame having the address of the first frame 72 and the CRC of the other frame 73 (HDLC frames have the address at the beginning of the frame and CRC at the end). Thus, if the CRC happens to check valid, the combined frame will be routed to the destination of customer A, but customer A will also receive an attached frame 73 of an unrelated user. If this frame contains ASCII text of a competitor, heavy business damage could result. This invention ensures that these frames will all be rejected by the Frame Relay network. This is accomplished at the receiveside PPM by writing a abort sequence 702 consisting of seven or more "ones". These aborts are injected after every flag whose following frame overlaps an FEC block containing errors 78. If the outside equipment does not tolerate the abort sequence (it may be designed to go out of service for a period of time) then an alternative abort method of the PPM of this invention is to buffer the bit stream for the depth of the CRC word size (16-bits), to deliver each frame with the errors, but to invert the last bit of the CRC code anytime it checks "valid" without this invention. The process just described is done on each tributary containing frame relay or similar HDLC-based information. A similar process takes place for ATM traffic.

Figure 8:
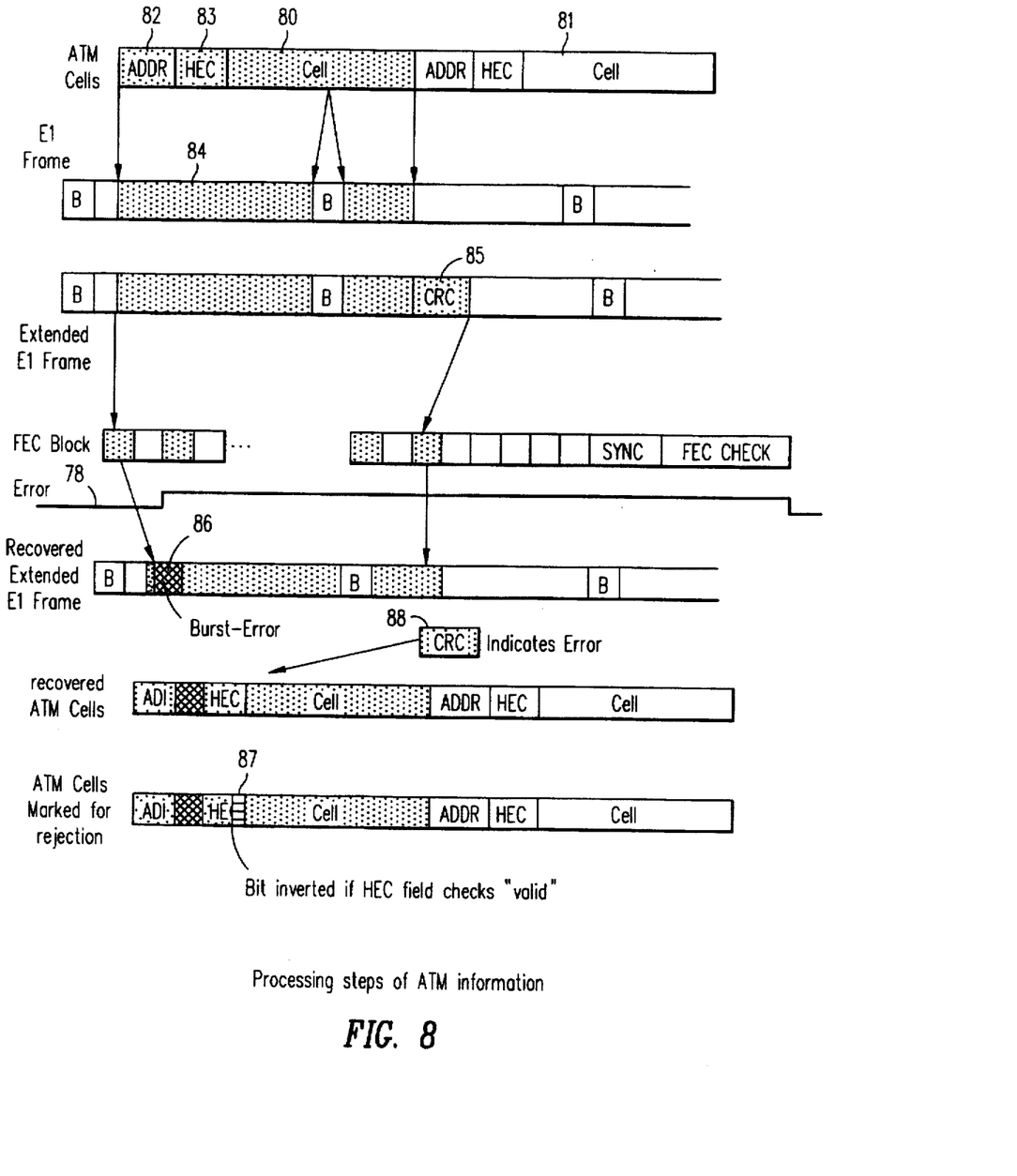
FIG. 8 illustrates Processing of ATM cells in this invention.

As shown in FIG. 8, the ATM cells 80 and 81 are of a fixed size (53 bytes) including a 5-byte header with a virtual path virtual circuit field (VPI/VCI) that is shown here as an address field 82. An eight-bit header error control code 83 (HEC) is also present. The ATM cells are mapped onto an E1 bit stream 84 according to ATM standards. This is the way the ATM cells enter the NAS of this invention in the preferred embodiment. Inside the NAS, the bit stream 84 is delivered to the PPM transmit side, which may append an extra CRC code. This code adds about 1.8% of bandwidth per each extra CRC byte, which increases slightly the radio link bandwidth, but may be acceptable in many applications. This CRC is only an option. The multiplexing to an FEC block is similar to the frame relay application and both may co-exist in separate tributaries. If an ATM cell is received with an error 86 that might have damaged the address 82, then this cell will normally contain a non-valid HEC byte 83. However, one of 256 such cells could check valid despite an error. There is no risk of fusing two cells like the frame relay case, but a cell can be misinserted and delivered to another service not related to the original destination. If the other service is error sensitive, such as compressed video or constant bit rate service, the insertion of a cell not related to that service will cause interruption of that service. A misinserted cell can travel in the network and cause an interruption of service in areas not expecting such events. Given the large number of cells traversing an ATM network, this phenomenon is quite likely. Misinsertion can affect the quality of service for the entire ATM network, not just for the link containing errors. Once an uncorrectable error has been detected by the FEC decoder, all cells included in this block are marked to be rejected. The marking involves the inversion of the last HEC bit in the event that if and only if this HEC would check "valid" without the inversion and this cell is desired to be rejected. The optional extra CRC 85 and 88, can further improve performance. As mentioned above, the FEC decoder can occasionally incorrectly decode an error. The CRC may still indicate that the last cell contains error; thus it may further reduce the chance of misinsertion. Using this CRC option, a cell is marked for rejection if either an FEC block indicates uncorrectable error or a CRC error has been detected.

Alternatively, one may use the CRC to reduce the number of lost cells. In this alternative, a cell is marked to be dropped if both the CRC and the FEC blocks indicate an error. Since the CRC is appended to a single cell, only this cell will be dropped; thus a burst error affecting one cell does not cause the loss of other cells of the same FEC block. The PPM of the preferred embodiment can perform both options. The choice is done by software configuration. The trade-off between extra cell loss and reduction of misinsertion probability is left to the system operators.

A third option is not to include the extra CRC. The need to check the CRC causes extra delay of about one cell which may be considered a poor trade off.

Figure 9:
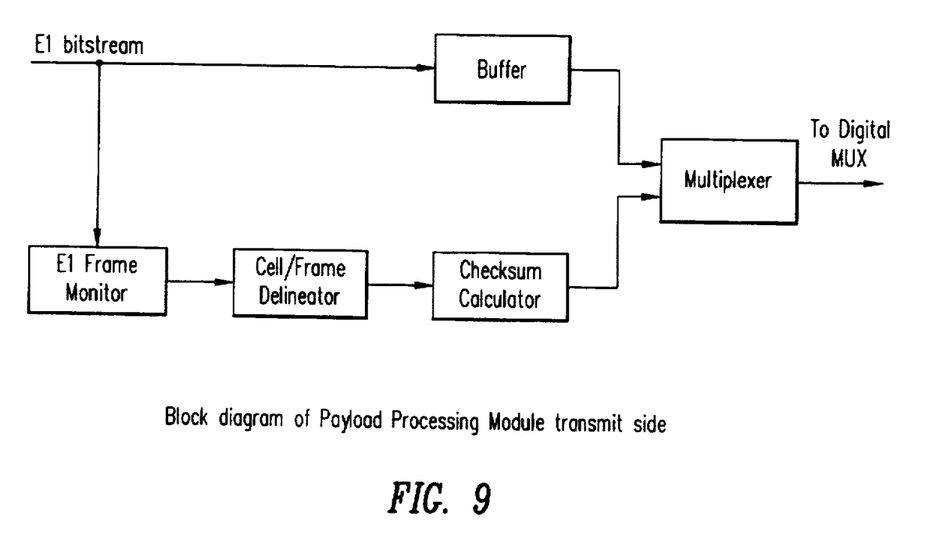
FIG. 9 illustrates a block diagram of the transmit side of the Payload Processing Module.

After describing the process of protecting frame relay and ATM cells, the PPM implementation is straight forward. A transmit side PPM is shown in FIG. 9. The transmit side appends the CRC to ATM cells and not to frame relay frames. An E1 frame monitor detects the framing byte of the E1, allowing separation of the payload frames/cells from the E1 bit stream. An off the shelf E1 framer can be used, such as Dallas Semiconductor of Dallas, Tex. DS2153Q. In a preferred embodiment, this function is performed by a field programmable gate array (FPGA). The next step is a cell/ frame delineator. For frame relay, this system detects flag symbols according to the HDLC protocol. The contiguous non-flag bits between two flags are considered "frames" and can be appended with an extra CRC. For ATM, cell delineation is done by searching for a byte position that results in valid HEC code for several consecutive 53-byte cells. This process is well documented in ATM standards. The delineated cells are then appended by a checksum calculator, preferably a CRC 8-bit code. A buffer holds the data while the CRC is being transmitted. A multiplexer selects between the data and the CRC. Obviously, the multiplexer's bit rate is increased by the added CRC overhead. The entire PPM section of FIG. 9 can be implemented by a field programmable gate array, such as EPF8820A made by Altera of San Jose, Calif. In fact, this circuit should occupy a small fraction of such an FPGA, allowing integration with the digital functions of the NAS.

Figure 10:
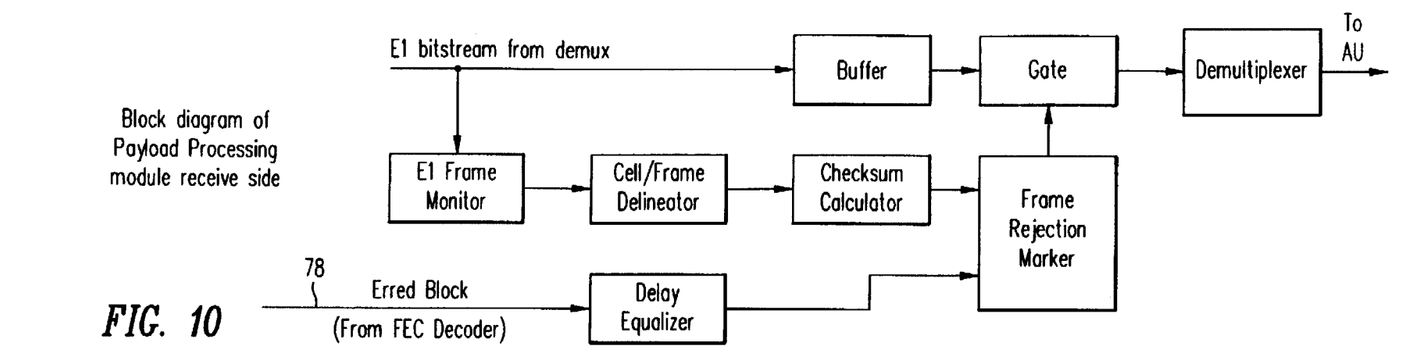
FIG. 10 illustrates a block diagram of the receive side of the Payload Processing Module.

As mentioned earlier, the PPM transmit side is optional. The receive side performs the main misinsertion protection process. The receive PPM is shown in FIG. 10. Similarly to the transmit side, it includes an E1 frame monitor and a cell (ATM) or frame (frame relay) delineator and a checksum calculator for the extra CRC in the ATM CRC option. This block may also calculate the HEC for ATM cells or the CRC of HDLC frames. The error signal 78 from the FEC block is delayed by a delay equalizer (a shift register) to equalize the error indication arrival time with the processing delay of the PPM. A frame rejection marker controls the marking of a frame or cell. For ATM cells this marker identifies the location of the last bit of the HEC, and it enables inversion of that bit if and only if this cell came from an errorcontaining block and the HEC checksum is valid. Alternatively, this block can be implemented to reject a cell only if the extra CRC is non-valid. In the case of frame relay, the frame rejection marker specifies the time at which an abort sequence of multiple ones will be issued. As mentioned, this will happen during all frames detected while an FEC error block signal 78 is received. A buffer allows for the omission of extra CRC bits if that option is implemented. A gate performs the actual marking. For bit inversion in ATM this is simply an exclusive OR gate. For HDLC abort it is an OR gate. Finally, a demultiplexer actually removes the optional CRC (if included) from the ATM cells.

Although not shown in the figures, it is customary with good engineering practice to store exceptional events such as uncorrectable error or the marking of an ATM cell for rejection in a register that can be addressed, read and cleared by the CU for reporting to the NMS. Also not shown but implemented are interface means to the CU by which the system is configured to operate in one protocol mode or another. These indications are usually done via configuration registers. An advantage of this invention is its transparency to the user's bit stream. All of the above processing does not alter the order or content of bits received at the NAS input to that delivered at the remote NAS output. The only intervention with the user stream is the occasional insertion of abort or bit inversions. This allows the system to operate in an automatic mode. As a new E1 port is activated, its bit stream is transmitted to the other side of the radio link. Once the PPM circuitry gains E1 frame synchronization and cell/frame delineation, it may start performing the misinsertion protection functions. If a PPM circuit fails to synchronize, the protection function is lost, but there is no interference with a user's traffic. Furthermore, this invention allows automatic detection of the protocol, assuming that the input protocol is one of a known set of distinct protocols. For example, supposing that the protocol can be either ATM, Frame Relay or PCM voice. The CU can start a protocol search by instructing the PPM receive side to look for ATM delineation. If successful, ATM is presumed and the process stops. If ATM delineation is not detected, the PPM is instructed to search for Frame Relay flags. This process is more elaborate because random data may also contain "flags". However a frame relay bit stream will occasionally contain many flags in sequence, signifying an idle period. In fact, a queuing system before an HDLC transmitter does not normally exceed 90% utilization; thus the flags are more likely than random data. Once the flags density rule is used to detect this protocol, abort correction may take place. If none of the above is present, the link is presumed to be non-protocol conforming and burst protection is not provided. The PPM may keep alternating between ATM and frame relay search modes until a protocol is discovered. The CU can also be programmed to operate in a non-automatic mode, in which only one protocol is chosen for a given interface. The multiprotocol capability can be implemented in several ways. One simple way is to duplicate the PPM circuit for each distinct protocol and enable only the output of a selected one. In the above example, it is more cost-effective to implement one generalized PPM with protocol variations embedded with each PPM block.

Figure 11:
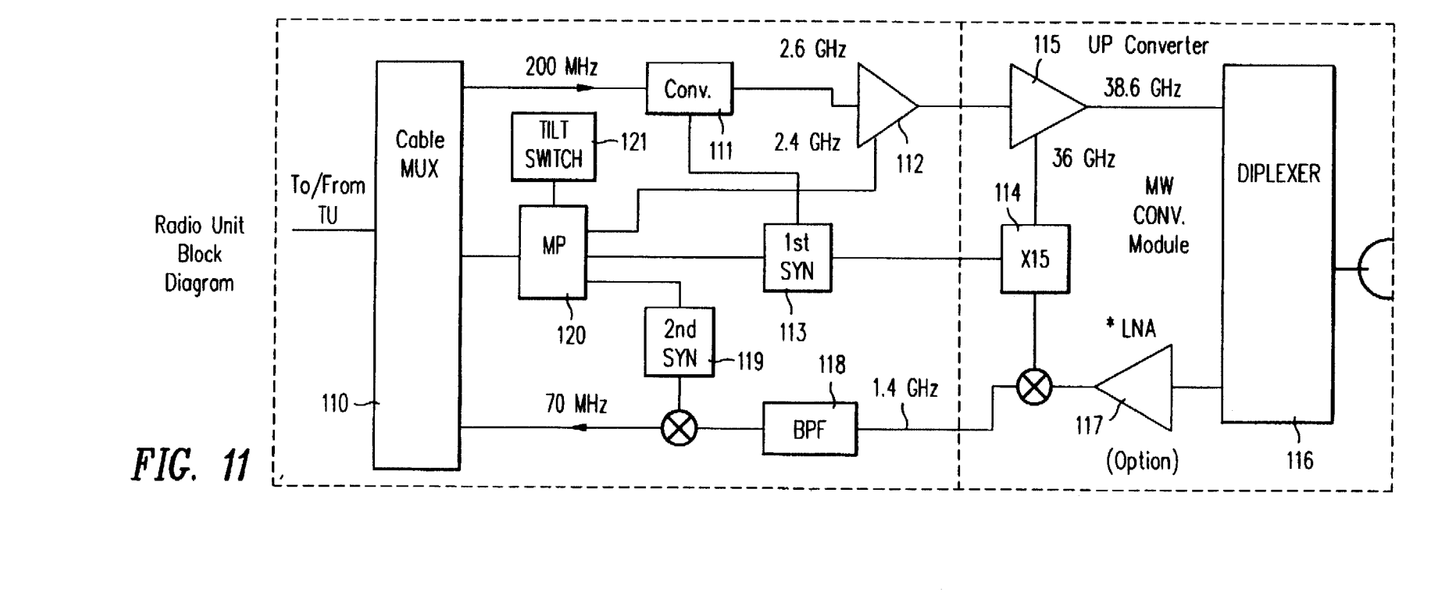
FIG. 11 is a block diagram of a linear radio unit suitable for use with this invention.

A radio unit is shown in FIG. 11. A coax cable from the NAS Trunk Unit carries all the information and DC power to the RU and the received signals from the RU. A cable multiplexer 110, identical to the NAS multiplexer 69 in FIG. 6, combines all of the involved signals (DC power is not shown). The transmitted signal may be at a frequency of 200 MHz. It is up-converted by a mixer 111 to 2.6 GHz. The mixer is driven by a synthesizer 113 of 2.4 GHz. Such synthesizers are commercially available from many sources, including Communications Techniques Inc. of Whippany, N.J. The mixed signal is amplified by a software controlled amplifier to allow power adjustment depending on the link range. Further conversion steps are possible until a desired frequency is reached. In the preferred embodiment one extra conversion takes place at 36 GHz taken from the 15th harmonic of the synthesizer 112 by a frequency multiplier 114. A mixer 115 converts the signal to 38.6 GHz, which may be the desired millimeter wave frequency. A diplexer 116 drives the dish antenna and receives a signal from the antenna at a different frequency, say 37.4 GHz. The received signal is amplified by an optional low noise amplifier 117 to minimize the system's noise figure. The signal is then down converted to a lower frequency (in this example to 1.4 GHz), filtered in band pass filter 118 and down converted again to 70 MHz by a 2.1 GHz synthesizer 119. The transmit amplifiers are kept at a linear mode of operation, allowing the variety of modulation schemes discussed above. FIG. 11 shows only few of the filters included. It is customary to use image rejection filters after any frequency conversion step, as is well known to radio engineers, but not always shown in FIG. 11. Also not shown are DC power distribution lines and AGC amplifiers that are typically used in such circuits. All of these features are well known to radio engineers. A microprocessor 120 controls the synthesizers and checks the integrity of the RU by measuring voltages in different test points in the RU. The microprocessor maintains a low bit rate link with the NAS Control Unit; thus the frequency and power settings of the RU are controlled directly by the CU and indirectly by the NMS. Of particular interest is a tilt switch 121 mounted on the radio unit. The RU can be mounted vertically or horizontally, allowing transmission/reception of either vertical or horizontal radio wave polarization. When the RU is placed vertically, the tilt switch is off. When placed horizontally it is on. The RU mounting hardware (not shown) is designed so that there are only two possible mounting positions; thus the switch status is an indication of the polarization. This allows the microprocessor 120 to read the switch position 121 and report the polarization to the CU and then to the NMS. Occasional mounting errors can thus be detected remotely at a low cost.

Other embodiments of this invention will be obvious to those skilled in the art in view of this disclosure.

We claim:

1. A digital radio link including:
    an access unit for transferring data packets of variable or fixed size to and from a plurality of line interfaces;
    a transfer circuit for receiving data from the access unit including a forward error correction encoder circuit for forward error correction encoding;
    a reception circuit for receiving data packets from the transmission circuit, said reception circuit including a forward error correction decoder for indication of an uncorrectable block; and
    a payload processing module for receiving bits from said forward error correction decoder and modifying some of said bits to reduce the chance of data packet misinsertion.

2. The digital radio link of claim 1 further including a plurality of line interfaces and payload processing modules for time division multiplexing and protecting against misinsertion multiple bit streams.

3. The digital radio link of claim 2 wherein said forward error correction decoder uses a block format compatible with the Reed Solomon code of the Digital Video Broadcast Standard.

4. The digital radio link of claim 1 wherein said data packets comprise ATM cells.

5. The digital radio link of claim 1 wherein said data packets comprise frame-relay frames.

* * * * *